United States Patent [19]

Yano et al.

[11] Patent Number: 5,127,671
[45] Date of Patent: Jul. 7, 1992

[54] PRETENSIONER SYSTEM

[75] Inventors: Hideaki Yano, Otsu; Tetsuo Tsuji, Hikone, both of Japan

[73] Assignee: Takata Corporation, Tokyo, Japan

[21] Appl. No.: 613,753

[22] PCT Filed: Jun. 15, 1990

[86] PCT No.: PCT/JP90/00783
§ 371 Date: Dec. 10, 1990
§ 102(e) Date: Dec. 10, 1990

[87] PCT Pub. No.: WO91/00202
PCT Pub. Date: Oct. 1, 1991

[30] Foreign Application Priority Data

Jun. 23, 1989 [JP] Japan .................................. 1-161788

[51] Int. Cl.⁵ ........................ B60R 22/36; B60R 22/16
[52] U.S. Cl. ..................................... 280/806; 180/282
[58] Field of Search ................. 280/801, 806; 180/282

[56] References Cited

U.S. PATENT DOCUMENTS

| | | | |
|---|---|---|---|
| 4,300,731 | 11/1981 | Kondziola | 280/806 |
| 4,647,071 | 3/1987 | Tabata | 280/806 |
| 4,718,148 | 1/1988 | McKernon et al. | |
| 4,840,325 | 6/1989 | Higuchi et al. | 280/806 |

FOREIGN PATENT DOCUMENTS

| | | |
|---|---|---|
| 240339 | 10/1987 | European Pat. Off. . |
| 3537891 | 5/1987 | Fed. Rep. of Germany . |
| 2630739 | 3/1990 | France . |
| 58062 | 12/1985 | Japan . |
| 106339 | 7/1986 | Japan . |
| 154449 | 6/1988 | Japan . |
| 229741 | 9/1989 | Japan . |
| 240345 | 9/1989 | Japan . |
| 269642 | 10/1989 | Japan . |
| 106455 | 4/1990 | Japan ................... 280/806 |
| 8705268 | 9/1987 | World Int. Prop. O. . |

*Primary Examiner*—Kenneth R. Rice
*Attorney, Agent, or Firm*—Kanesaka and Takeuchi

[57] ABSTRACT

The present invention is direted to a pretensioner system for positively eliminating loosening of a seat belt to effectively restrain a vehicle occupant during vehicle collision. The pretensioner system includes an acceleration sensing device (30) for sensing acceleration of a vehicle, a loosening eliminating device (14) for pulling the seat belt sidewardly to eliminate loosening of the seat belt in response to a signal from the acceleration sensing device (30), and a lock device (15) for locking the seat belt by sandwiching the same after loosening of the seat belt has been eliminted. The lock device (15) has cooperable members (24, 29C, 32) to sandwich the seat belt in accordance with movement of the loosening eliminating device (14).

7 Claims, 9 Drawing Sheets

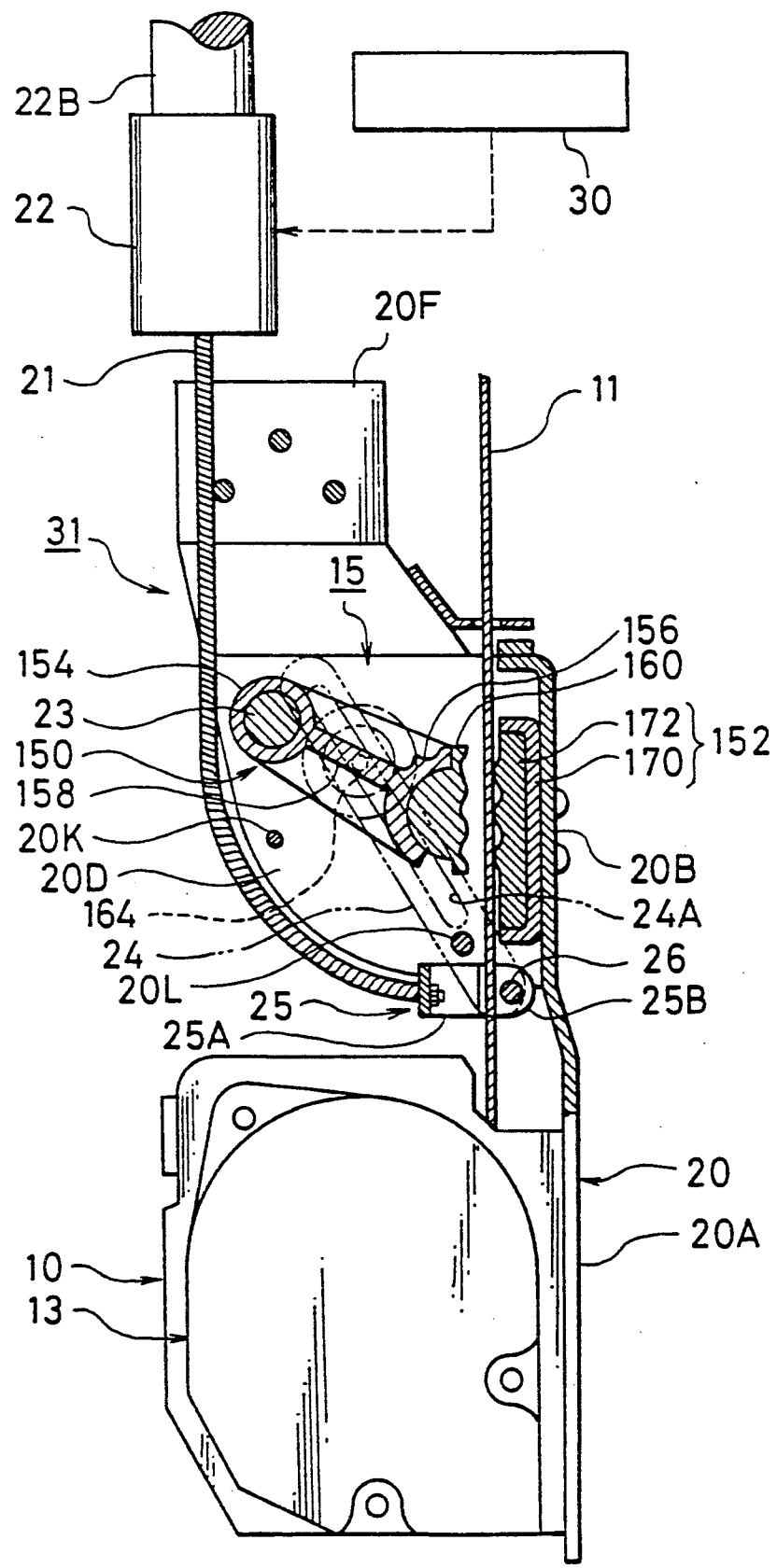

1

PRETENSIONER SYSTEM

TECHNICAL FIELD

The present invention relates to a pretensioner system which rapidly eliminates loosening of a seat belt in response to sudden acceleration of a vehicle, and inhibits retraction of the seat belt.

BACKGROUND ART

An automotive vehicle includes a seat belt system to restrain a vehicle occupant in a seat during vehicle collision so as to protect the occupant from a second collision.

When such a seat belt system is used to restrain an occupant, a seat belt must be fastened so as not to separate the seat belt from the occupant, or leave a space between the seat belt and the occupant. Otherwise, a decrease in the restraint effect occurs. This is due to the fact that during collision the occupant is forced, due to inertia, to move by a distance corresponding to the space between the seat belt and the occupant.

In order to prevent such a decrease in the restraint effect, there has been employed a seat belt retractor with a pretensioner system constructed as shown in FIG. 4.

As shown in FIG. 4, such a seat belt retractor with a pretensioner system comprises a reel shaft 3 around which a seat belt 5 is wound, the seat belt 5 being retractable into and extractable from the reel shaft 3, a pulley 4 fixedly mounted to one end of the reel shaft 3, a wire rope 2 composed of a plurality of metal wires and wound, with a predetermined space, around the pulley 4 a plurality of times, and a pull device 1 for pulling the wire rope 2.

During vehicle collision, such a conventional seat belt retractor with pretensioner system operates as follows.

Means (not shown) is provided to sense sudden acceleration of a vehicle and generate an electrical signal. The pull device 1 is responsive to this signal so as to rapidly pull the wire rope 2 in the direction of the arrow A.

The wire rope 2 is then wound around the pulley 4. The friction between the wire rope 2 and the pulley 4 causes the pulley 4 to rapidly rotate in the direction of the arrow B.

As the pulley 4 is fixed to the reel shaft 3, the rotation of the pulley 4 causes retraction of the seat belt 5 into the reel shaft 3. This eliminates the space between the occupant and the seat belt, or loosening of the seat belt.

It is considered that the seat belt retractor with the pretensioner system thus constructed is capable of preventing such a decrease in the restraint effect since the seat belt 5 is rapidly brought into close contact with the occupant during collision.

However, in the seat belt retractor with the pretensioner system thus constructed, an unexpected amount of slippage occurs between the wire rope 2 and the pulley 4 when the wire rope 2 is rapidly pulled. It is, therefore, difficult to adequately control the length of seat belt 5 taken up or pulled back.

If the amount of slippage between the wire rope 2 and the pulley 4 is greater than an expected value, the seat belt 5 is not sufficiently brought into close contact with the occupant. On the contrary, if the amount of slippage is less than an expected value, there is a problem that the seat belt 5 too tightly extends across the occupant.

Also, in the prior art seat belt retractor with the pretensioner system, the reel shaft 3, rather than the seat belt 5 per se, is rotated to eventually retract the seat belt 5.

As such, even if the seat belt 5 is appropriately brought into close contact with the occupant by rotating the reel shaft 3 to retract the seat belt 5, the occupant is forced to move forward due to inertia to cause the seat belt 5 to be tightly wound around the reel shaft 3. This allows the occupant to move forward, thus failing to effectively restrain the occupant.

DISCLOSURE OF THE INVENTION

Accordingly, it is an object of the present invention to provide a pretensioner system which positively eliminates loosening of a seat belt during collision and effectively restrains a vehicle occupant.

According to the present invention, a pretensioner system is characterized by an acceleration sensing device for sensing sudden acceleration of a vehicle, loosening eliminating device for pulling a seat belt sidewardly to eliminate loosening of the seat belt in response to a signal from the acceleration sensing device, and lock device for locking the seat belt by sandwiching the same after loosening of the seat belt has been eliminated, the lock means including cooperable mechanism for cooperating with the loosening eliminating device so as to lock the seat belt.

Preferably, the lock device includes a first grip member rotatable in accordance with movement of the loosening eliminating device, and a second grip member placed in confronting relation to the first grip member in a manner to sandwich the seat belt therebetween.

In other words, a pretensioner system of the present invention comprises a pair of first and second grip members for sandwiching a seat belt therebetween, the first grip member being movable toward and away from the second grip member, a pull member having a portion through which the seat belt extends between the first and second grip members, a pull device for rapidly pulling the pull member in a direction transversely of the seat belt, and moving device for moving the first grip member toward the second grip member when the pull member is pulled.

According to one embodiment of the present invention, the first grip member has a base end pivotally connected to a frame and the other end pivotally movable toward and away from the second grip member. The moving device includes arm plates each having one end pivotally connected to the pull member, the arm plates having at the other end elongated holes into which ends of the first grip member extend. The arm plates are operable to move the first grip member toward the second grip member when the pull member is pulled by the pull device.

In another embodiment, the moving device includes a spring for urging the first grip member to move toward the second grip member, and a stopping device for stopping the first grip member in position remote from the second grip member and for releasing the first grip member when the pull member is pulled by the pull device.

In a particular embodiment, the stopping means includes a pin extending from the first grip member and engaged with the frame, and a hook portion extending from the first grip member and engageable with the pull member when the pull member is moved by the pull device so as to move the first grip member whereby the pin is broken to release the first grip member from the frame.

In a different embodiment, the stopping device is a rope extending between the first grip member and the pull member. The rope can be broken to release the first grip member when the pull member is moved by the pull device.

According to another embodiment of the present invention, a retractor is mounted to the frame so as to retract and extract the seat belt. The second grip member is fixedly mounted to or slidably mounted to the frame so as to move away from the retractor.

The present invention thus constructed operates as follows:

When sudden acceleration is sensed by the acceleration sensor means during collision, the loosening eliminating device is operable to eliminate loosening of the seat belt extending across a vehicle occupant.

The seat belt, after loosening has been eliminated, is then sandwiched and locked by the lock device. Loosening of the seat belt is positively eliminated to effectively restrain the vehicle occupant in a seat.

BRIEF DESCRIPTION OF THE DRAWINGS

FIG. 2A is a sectional side view, in part, of the pretensioner system taken along the line 2A—2A of FIG. 1A;

BEST MODE FOR CARRYING OUT THE INVENTION

Figure 1A:
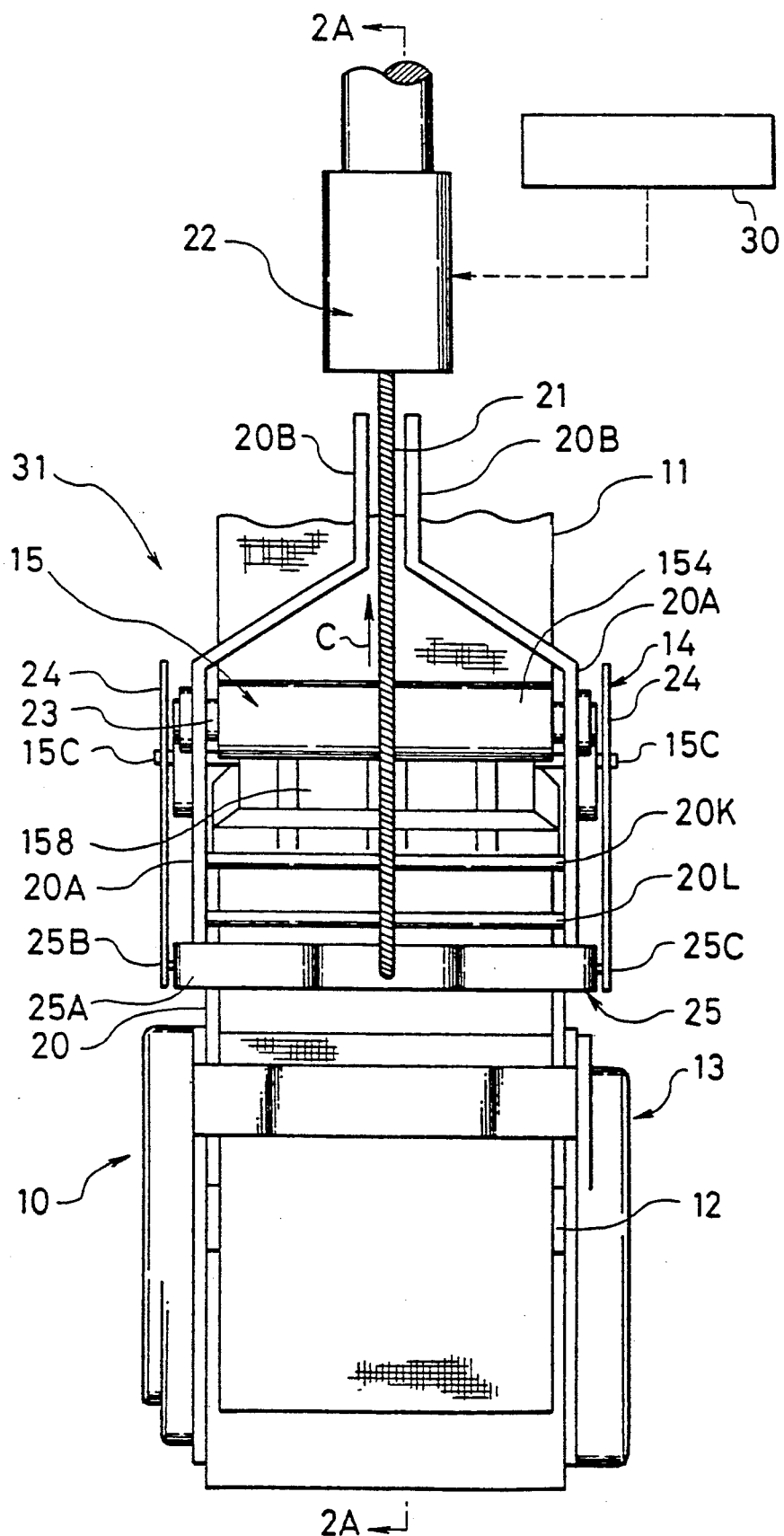
FIG. 1A is a front view of a pretensioner system made according to one embodiment of the present invention and a seat belt retractor.
Figure 1B:
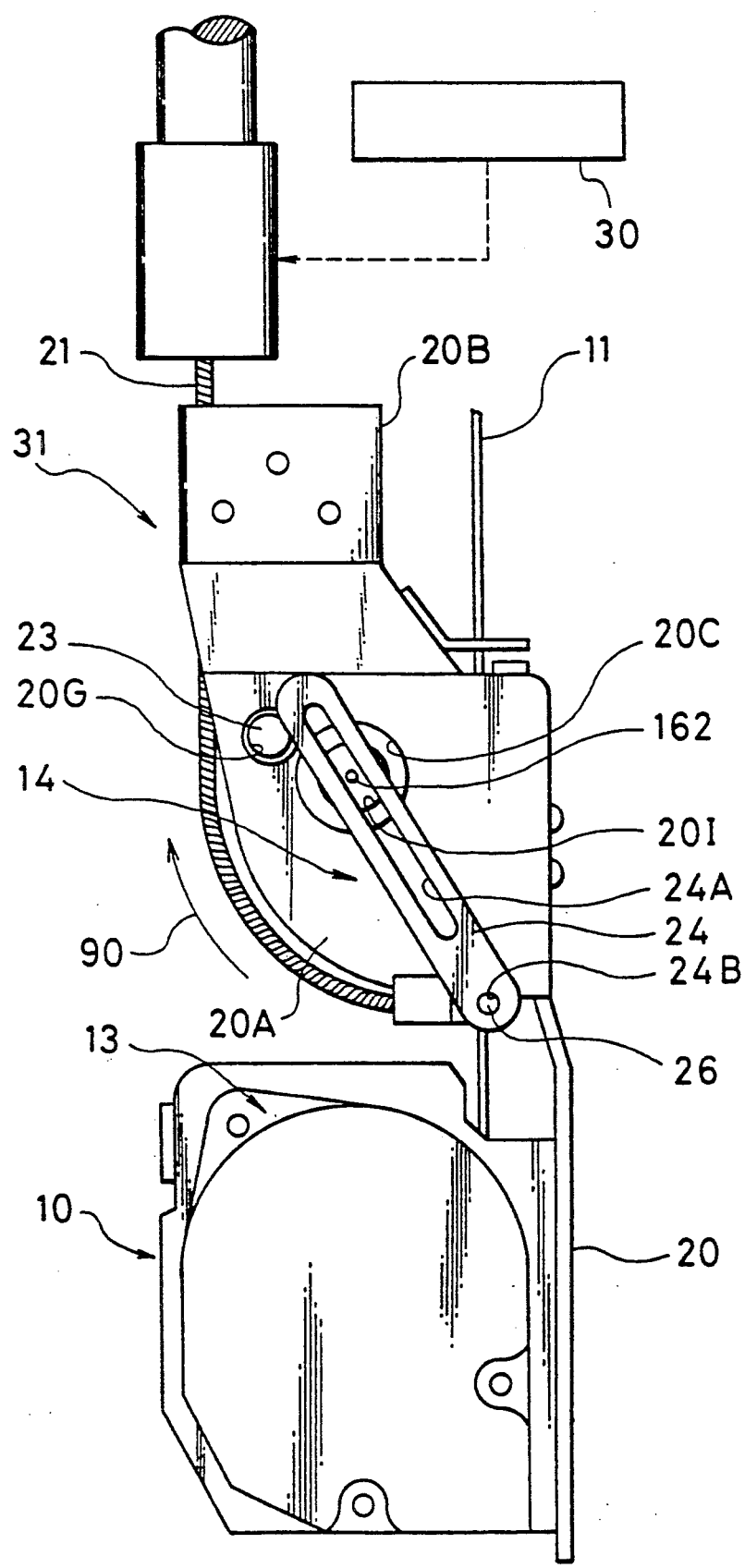
FIG. 1B is a side view of the pretensioner system.

FIGS. 1A and 1B are front and side views, respectively of a pretensioner system 31 according to one embodiment of the present invention, and a seat belt retractor 10 mounted adjacent to the pretensioner system 31.

As shown in FIGS. 1A to 1B, the seat belt retractor 10 includes a reel shaft 12 rotatable in accordance with retraction and extraction of a seat belt 11, and a known lock mechanism 13 constructed to lock the reel shaft 12 when sudden acceleration occurs. The seat belt retractor 10 is fixed to a first flat plate portion 20A which constitutes a lower half of a frame 20.

Figure 5:
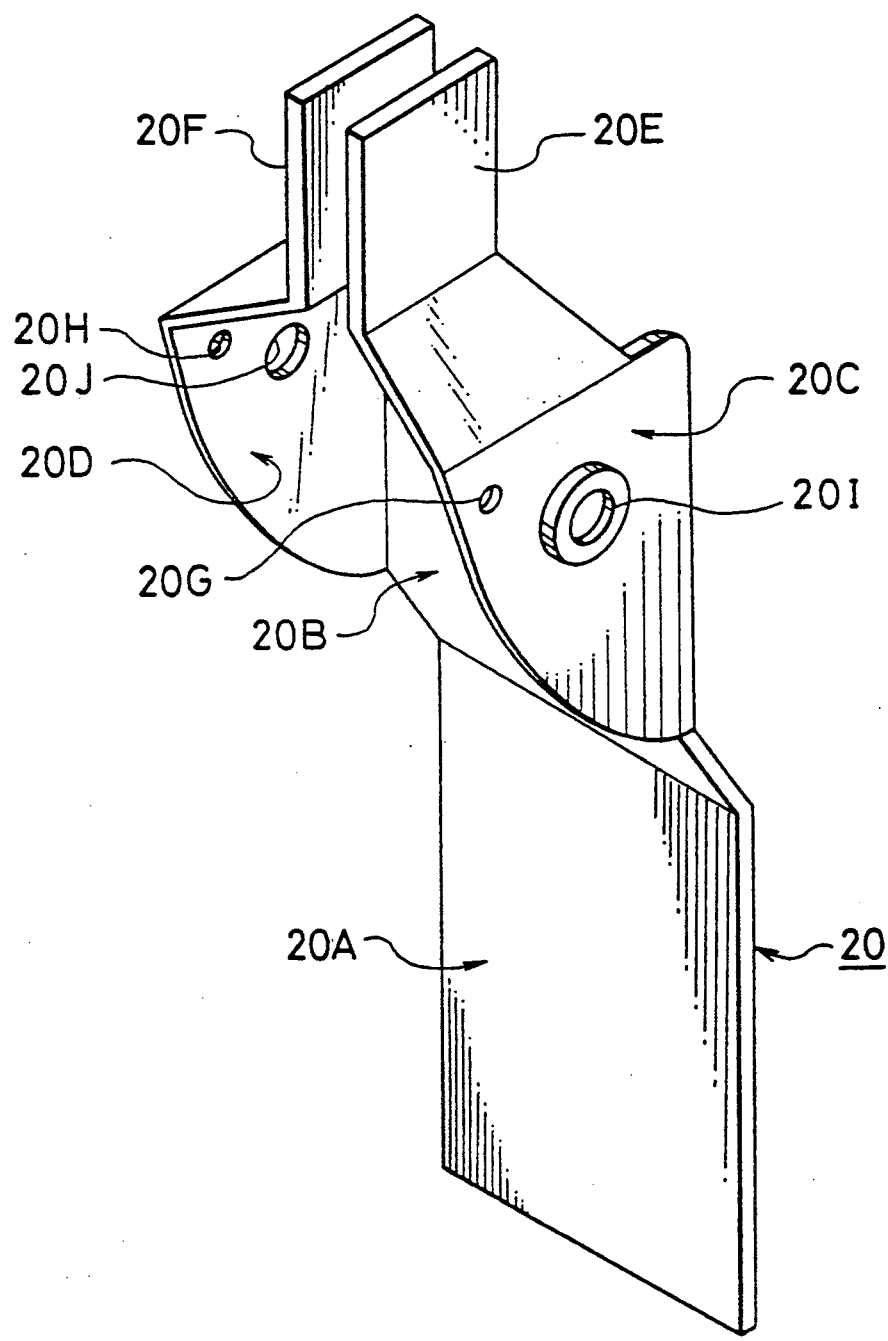
FIG. 5 is a perspective view of a frame.
Figure 6:
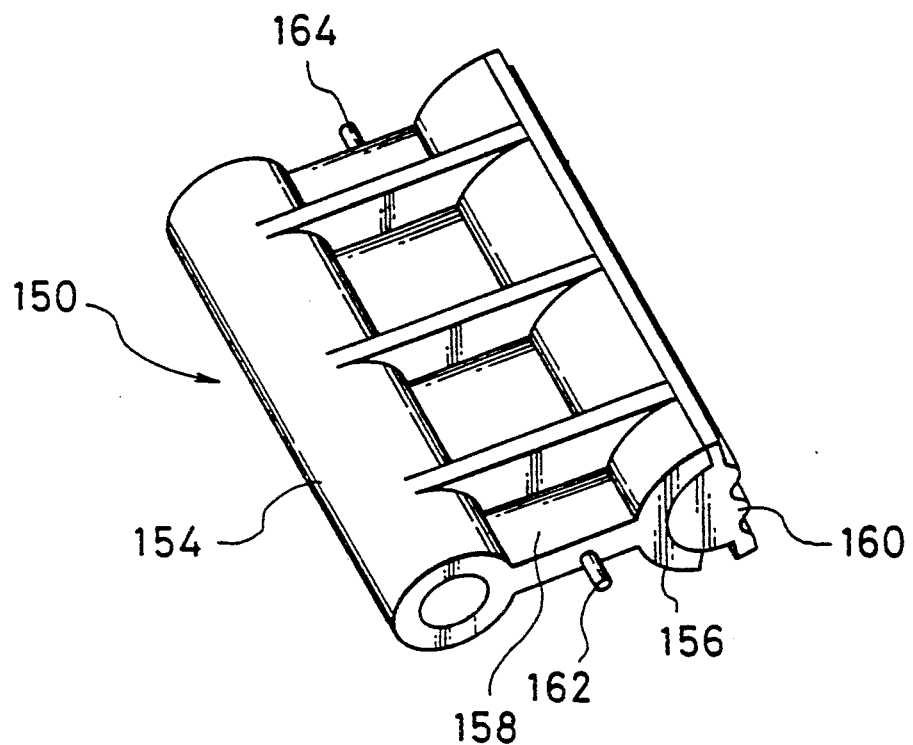
FIG. 6 is a perspective view of a pusher 150.

As shown clearly in FIG. 5, the frame 20 includes the first flat plate portion 20A which constitutes the lower half of the frame 20, a second flat plate portion 20B which constitutes a upper half of the frame, a pair of opposite side plate portions 20 C and 20D bent from opposite sides of the second flat plate portion 20B, and wire guide portions 20 E and 20F extending upwardly from the opposite side plate portions 20C and 20D. The opposite side plate portions 20C and 20D have support holes 20G and 20H through which a shaft 23 extends as will hereinafter be described, and window holes 20I and 20J through which pins 162 and 164 extend as will hereinafter be described. Two guide bars 20K and 20L extend between the opposite side plate portions 20C and 20D so as to guide the seat belt 11.

The pretensioner system 31 according to one embodiment of the present invention is located above the seat belt retractor 10.

The pretensioner system 31 includes an acceleration sensing device 30 for sensing acceleration, a loosening eliminating device 14 operable in response to a signal from the acceleration sensing device 30 to pull the seat belt sidewardly so as to rapidly eliminate loosening of the seat belt 11, and a lock device 15 for locking the seat belt 11 by sandwiching the same after loosening of the seat belt 11 has been eliminated.

The acceleration sensing device 30 has an acceleration sensor, and a controller for analyzing the output from the acceleration sensor and providing a loosening eliminating signal to the loosening eliminating device 14 when the sensed sudden acceleration is greater than a predetermined level.

Figure 7:
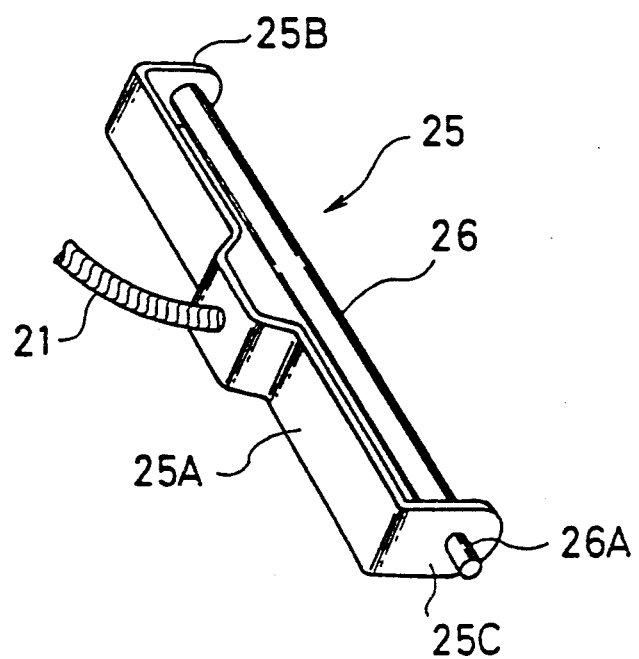
FIG. 7 is a perspective view of a pull member 25.

The loosening eliminating device 14 has a pull member 25 for pulling the seat belt 11. As shown clearly in FIG. 7, the pull member 25 includes a holding member 25A in the form of a narrow plate, and a cylindrical member 26 supported between elbow portions 25B and 25C bent from opposite ends of the holding member 25A. Opposite ends 26A of the cylindrical member 26 extend outwardly from the elbow portions 25B and 25C. The loosening eliminating device 14 further includes a metal wire 21 having one end connected to the midpoint of the holding member 25A and the other end connected to a pull device 22 as will hereinafter be described, and the pull device 22 for immediately pulling the wire 21 (in the direction of the arrow 9C) upon receipt of an acceleration signal from the acceleration sensing device 30, and a pair of arm plates 24 for supporting the pull member 25. The arm plates 24 has a circular hole 24B at its front end, and an elongated hole 24A extending from the midpoint to its rear end. One end 26A of the cylindrical portion 26 is engaged with the circular hole 24B.

The pull device 22 is fixed to a reinforcement member (not shown) of the vehicle through the bracket 22B.

The lock device 15 includes a pusher 150 for sandwiching the seat belt 11 and serving as a first grip member, and a receiver 152 for serving as a second grip member. The pusher 150 has a cylindrical portion 154, a semicylindrical portion 156, a connecting plate portion 158 adapted to provide a connection between the cylindrical portion 154 and the semicylindrical portion 156, and a contact piece 160 received in the semicylindrical portion 156. A shaft 23 extends through the cylindrical portion 154 and has opposite ends fit in the support holes 20G and 20H of the opposite side plate portions 20C and 20D, respectively. By this arrangement, the end portion of pusher 100 which the contact piece is attached is freely rotated about the shaft 23. Pins 162 and 164 extend from opposite sides of the connecting plate portion 158.

The pins 162 and 164 extend through the window holes 20I and 20J of the frame 20 and into the elongated holes 24A of the arm plates 24.

The receiver (second grip member) 152 has a receiver holder 170 fixed to the second flat plate portion 20B of the frame 20, and a contact piece 172 received in the receiver holder 170. The contact piece 160 and 172 can be in direct contact with the seat belt 11 and have surfaces corrugated to prevent the seat belt 11 from slipping out of the contact pieces 160 and 172.

Figure 2B:
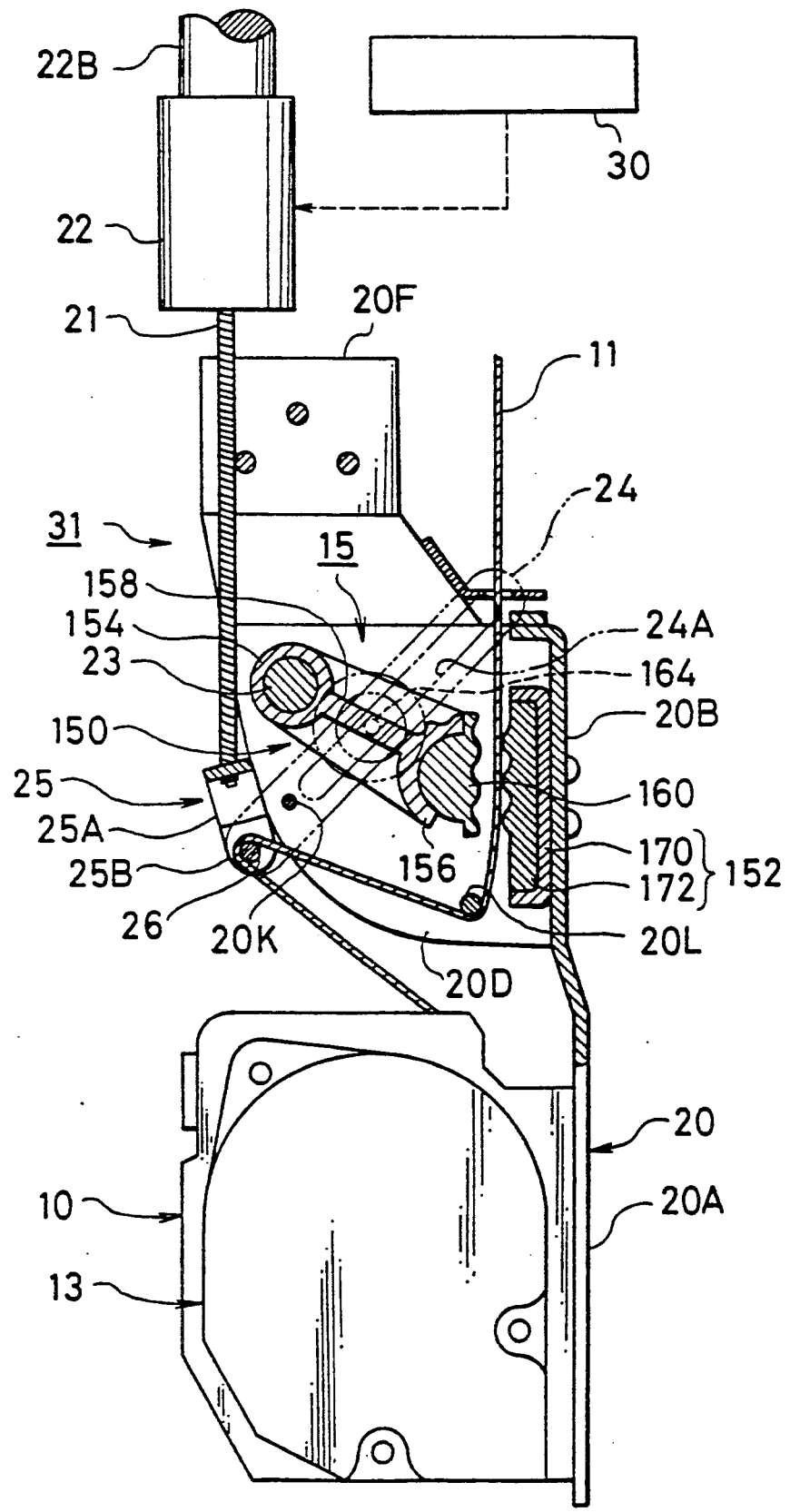
FIGS. 2B and 2C are views showing the pretensioner system in use.
Figure 2C:
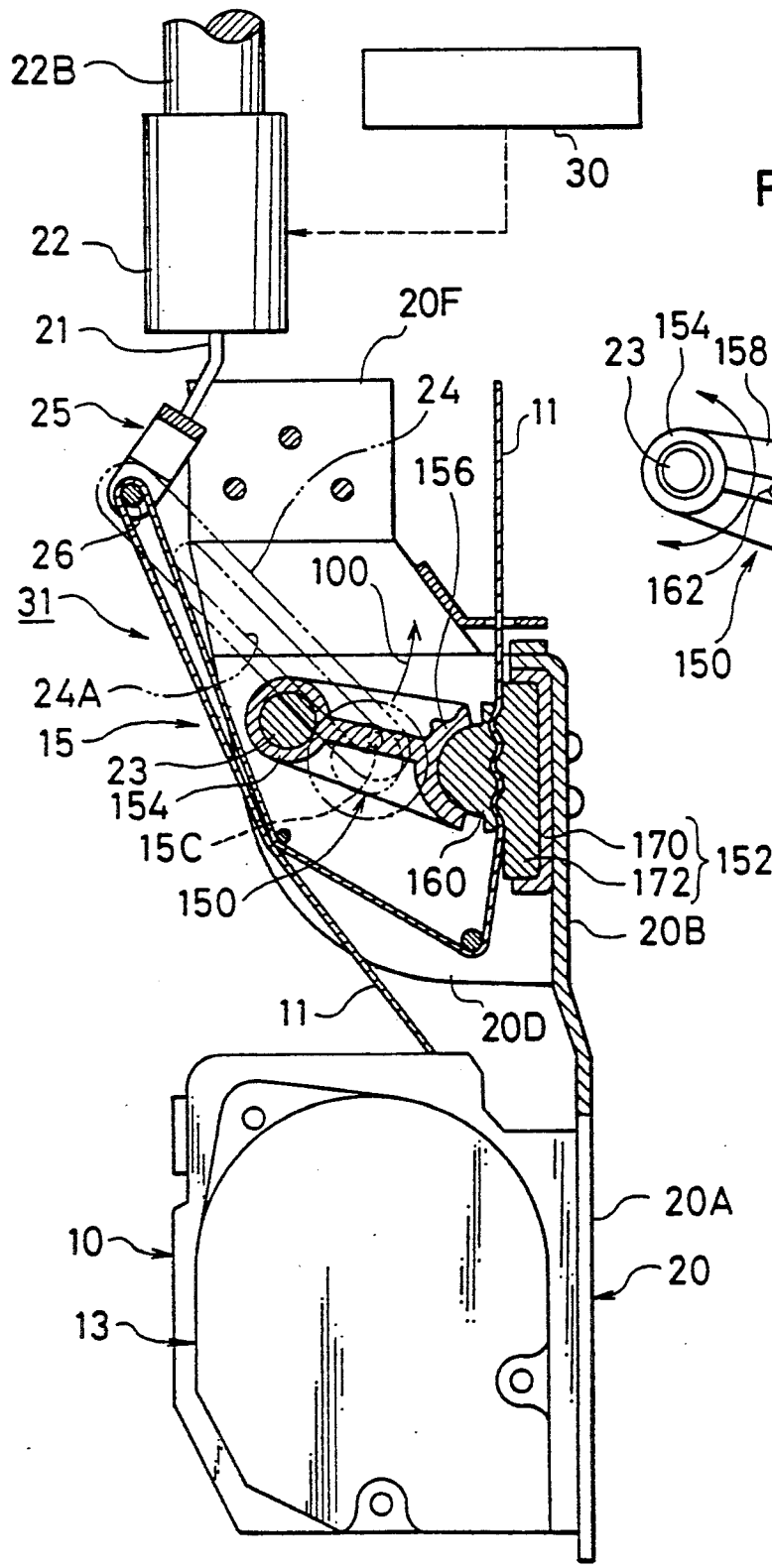

With reference to FIGS. 2A to 2C, operation of the pretensioner system 31 thus constructed will now be described in connection with the seat belt retractor 10.

Firstly, when there is no sudden acceleration which may, for example, arise from vehicle collision, that is, when the vehicle normally travels, the seat belt 11 extends across the occupant (not shown) seated in a seat.

The seat belt 11 loosely extends across the occupant since a biasing spring (not shown) is used to bias the seat belt 11 in such a direction as to take up the seat belt 11.

In the seat belt retractor 10 which functions to release tension of the seat belt, the seat belt 11 is spaced at a predetermined distance away from the occupant, so that the occupant may feel unrestrained. Under the circumstances, that is, with the arrangement shown in FIG. 2, if vehicle collision occurs, the acceleration sensing device 30 is operable to sense sudden acceleration. Upon receipt of a signal from the sensing device 30, the pull device 22 is operable to rapidly pull the wire 21 (At the same time, the lock mechanism 13 is operable to strongly lock the reel shaft 12. This prevents extraction of the seat belt 11 by the reel shaft 12).

When the pull device 22 becomes active, the seat belt 11 is pulled sidewardly by the pull member 25 as shown in FIG. 2B. A portion of the seat belt 11 which restrains the occupant is then pulled back toward the pretensioner system 31 so as to eliminate loosening of the seat belt 11. Subsequently thereafter, the seat belt 11 is strongly sandwiched between the pusher 150 and the receiver 152. In other words, the pull member 25 is pulled by the wire 21 and moved to the left in FIGS. 1B and 2B. Then, the lower ends of the arm plates 24 to which the pull member 25 is mounted are pivotally moved to the left in FIGS. 1B and 2B. This causes sliding movement of the pins 162 and 164 within the elongated holes 24A.

When the pull device 22 further pulls the pull member 25, the pull member 25 is moved from the position shown in FIG. 2B toward the position shown in FIG. 2C. When the pull member 25 is pulled to a nearly full extent, the pins 162 and 164 on the sides of the pusher 150 come into contact with one ends of the elongated holes 24A of the arm plates 24, respectively.

When the wire 21 is further pulled, the pusher 150 is eventually fully rotated about the shaft 23 in a counterclockwise direction (direction of the arrow 100) in accordance with movement of the arm plates 24 and 24 as shown in FIG. 2C. The seat belt 11 is then sandwiched between the pusher 150 and the receiver 152. As the pull device 22 continues to pull up the arm plates 24, the seat belt 11 is firmly sandwiched between the contact piece 160 of the pusher 150 and the contact piece 172 of the receiver 152. As a result, the seat belt 11 is no longer extracted even if the occupant is moved forward to force the seat belt 11 upwards in FIG. 2C, and the vehicle occupant can strongly be restrained.

During such a series of operations, the seat belt 11 can not be extracted from the reel shaft since the reel shaft of the seat belt retractor 10 is locked by the lock mechanism 13.

In the embodiment thus described, the wire 21 is rapidly pulled so as to eliminate loosening of the seat belt 11. Thus, the seat belt 11 can easily and positively be brought into close contact with the vehicle occupant so as to restrain the occupant in the seat.

Also, the seat belt 11 is sandwiched between the pusher 150 and the receiver 152. Therefore, the seat belt 11 can in no way be extracted even if the occupant is moved forward due to inertia to apply a substantial force to pull the seat belt 11. This solves such a problem encountered in the prior art that the seat belt is tightly wound around the reel of the seat belt retractor to allow forward movement of the occupant and thus, fail to effectively restrain the occupant.

Figure 2D:
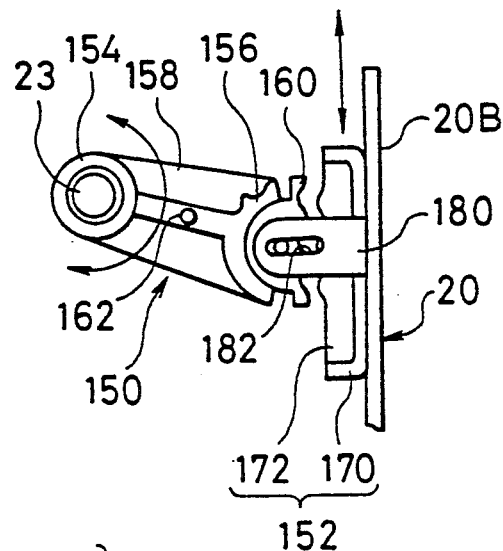
FIG. 2D is a side view showing the principle part of another embodiment of the system.

FIG. 2D is a side view showing the principal part of a pretensioner system according to another embodiment of the present invention.

In FIG. 2D, the receiver 152 is vertically slidable along the second flat plate portion 20B of the frame 20. A pair of plate-like brackets 180 extend from the receiver 152 toward the pusher 150. Each bracket 180 has a horizontally extending elongated hole 182. Pins 184 extend from opposite ends of the contact piece 160 and are engaged with the elongated holes 182. As in the previous embodiment, the pusher 150 is rotated through the pull device 22, the wire 21, the pull member 25, and the arm plates 24 (not shown in FIG. 2D). When the pusher 150 is rotated upwardly, the seat belt 11 is sandwiched between the contact pieces 160 and 172. Further rotation of the pusher 150 causes upward sliding movement of the receiver 152.

Figure 3A:
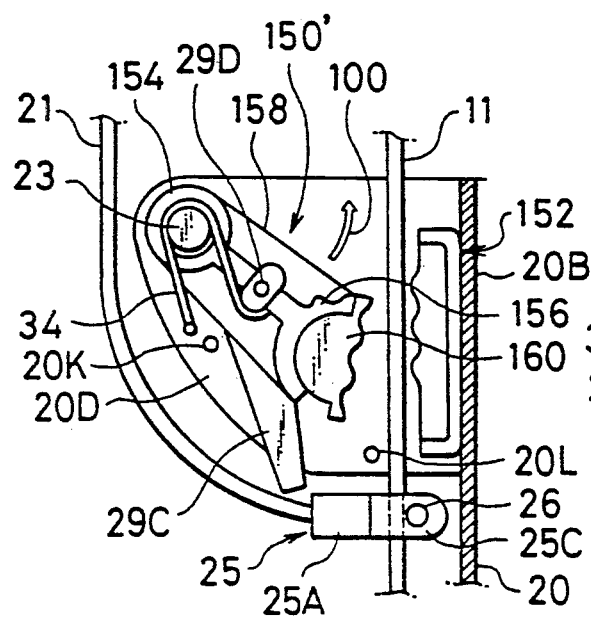
FIGS. 3A and 3B are side views of a lock device in another form.

FIG. 3A illustrates a further embodiment of the present invention. FIG. 3C is a perspective view of the pusher 29 looking from the below. Like elements are given like reference numerals used in FIGS. 1A to 1B and will not be described.

Figure 3B:
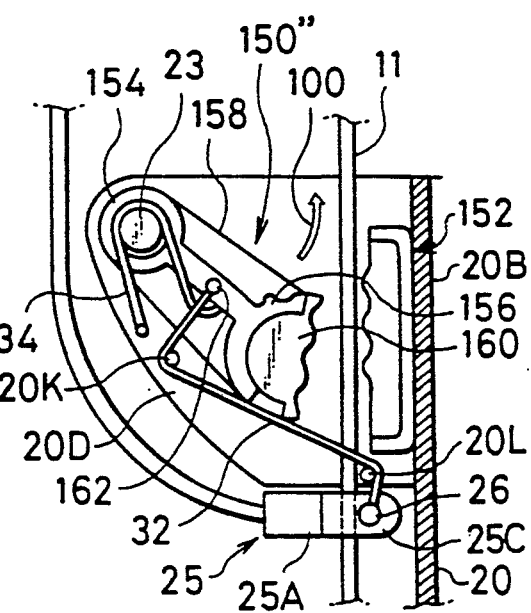
Figure 3C:
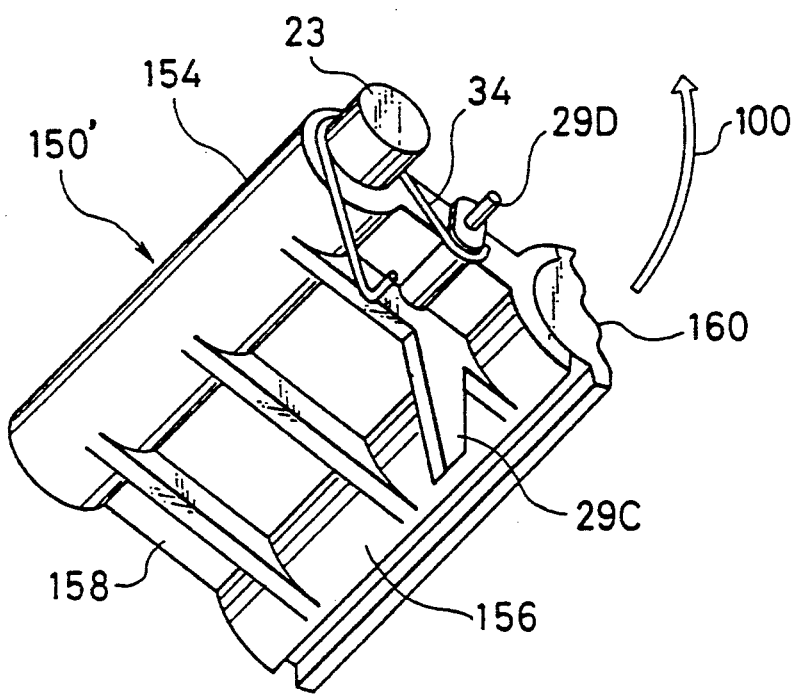
FIG. 3c is a perspective view of a pusher 29.
Figure 4:
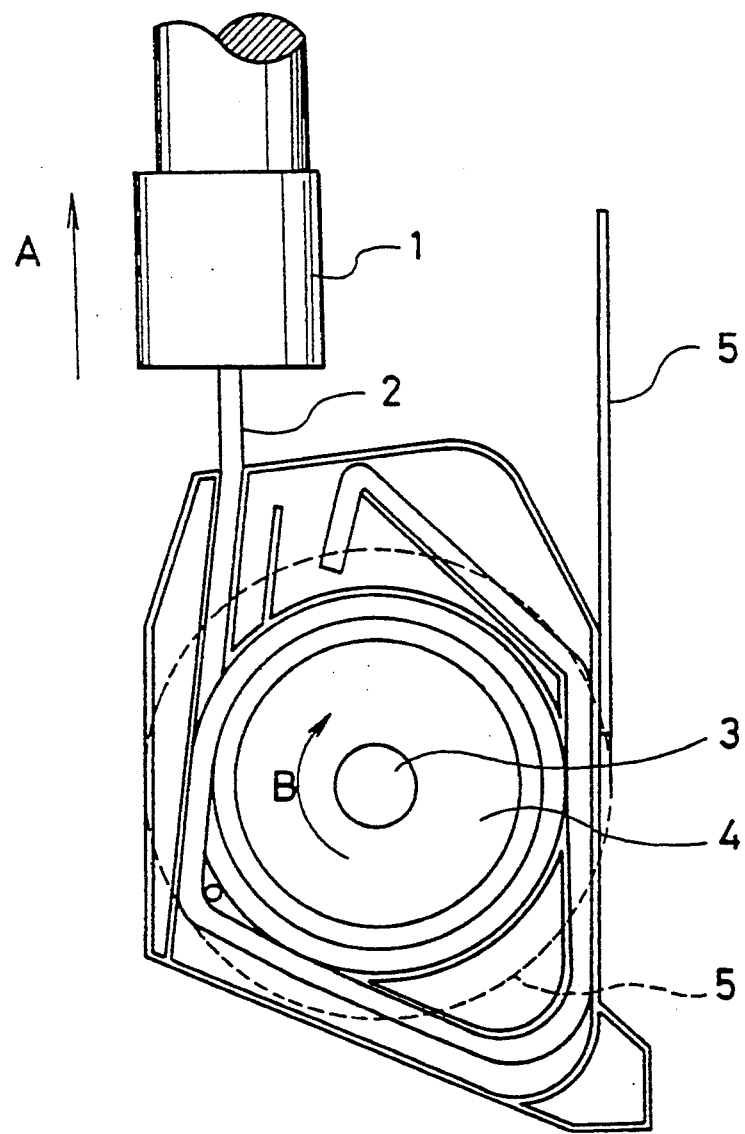
FIG. 4 is a side view of a seat belt retractor with a conventional pretensioner system.

As shown in FIGS. 3A to 3C, a pusher 150' is fit around the shaft 23. The pusher 150' includes a spring 34 adapted to urge the pusher 29 to rotate in a counterclockwise direction (direction of the arrow 100), a hook (projection) portion 29C integral with the pusher 29 and contactable with the pull member 25 when the wire 21 is pulled by the pull member 25, and a pin (shear pin) 29D designed to prevent the pusher 150' from rotating against the action of the spring 34. The pin 29D is made from a material less in strength than that of the pusher 150' and extends from the pusher 150'. Although not shown in FIGS. 3A to 3C, the pin 29D, like the pin 162, is in engagement with the window holes 20I and 20J of the base plate. The spring 34 has one end fixed to the pusher 29 and the other end fixed to the side plate portion 20C (or 20D) of the base plate 20.

When the vehicle normally travels, the pusher 150' thus constructed is rotated upwardly under the action of the spring 34, and the pin 29D is in engagement with the window holes 20I and 20J as shown in FIG. 3A.

If sudden acceleration occurs under the circumstances, the pull member 25 is pulled by the pull device 22 through the wire 21 to move along the lower edge of the opposite side plate portions 20C and 20D. The pull member 25 is then brought into contact with the hook portion 29C so as to apply a force to move the pusher 150' downwards. Application of such a force causes the pin 29D to break. Then, the pusher 150' is slightly moved down. The pull device 25 thereafter passes through the hook portion 29C. The puller 150' is rotated upwardly under the action of the spring 34. As in the previous embodiment, the seat belt 11 is firmly sandwiched between and locked by the pusher 150' and the receiver 152.

In FIG. 3B, a pusher 150" has the same spring 34 as shown in FIG. 3A and is connected to the pull member 25 through a rope 32. The rope 32 passes around guides 20K and 20L and has one end secured to the pin 162 and the other end secured to one end of the cylindrical member 26.

When the vehicle normally travels, the pusher 150" is held in position by the rope 32 against the action of the spring 34 as illustrated.

When the pull member 25 is pulled by the pull device 22 through the wire 21 during vehicle collision, the rope 32 is cut by the movement of the pull member 25. Consequently, the pusher 150" is rotated in a counter-clockwise direction (direction of the arrow 100) under the action of the spring 34. As in the previous embodiment, the seat belt 11 is firmly sandwiched between and locked by the pusher 150" and the receiver 152.

As explained above, the present invention is much more reliable and considerably simple in structure, thus making the instant system small in size and light in weight.

In the foregoing embodiments, the pretensioner system is provided above the seat belt retractor. The pretensioner system may be provided at any position between the occupant and the seat belt retractor. It may also be located adjacent to an anchor point. Either arrangement have the same advantages as the foregoing embodiments do.

INDUSTRIAL APPLICABILITY

According the present invention, loosening of the seat belt is positively eliminated during collision so as to effectively restrain the occupant.

We claim:
1. A pretensioner system for a seat belt comprising,
   a frame,
   a pair of first and second grip members for sandwiching the seat belt therebetween, said first grip member having a base end pivotally connected to the frame and the other end pivotally movable toward and away from said second grip member,
   a pull member having a portion through which the seat belt extends between said first and second grip members,
   a pull device for rapidly pulling said pull member in a direction transversely of the seat belt, and
   moving means for moving said first grip member toward said second grip member when said pull member is pulled, said moving means including a spring for urging said first grip member to move toward said second grip member and stopping means for stopping said first grip member in a position remote from said second grip member and for releasing said first grip member when said pull member is pulled by said pull device, said stopping means including a pin extending from said first grip member and adapted to engage with said frame and a hook portion extending from said first grip member and adapted to engage with said pull member when the pull member is pulled by said pull device so as to move said first grip member whereby said pin is broken to release said first grip member from said frame.

2. A pretensioner system as claimed in claim 1, further including acceleration means for providing an operation signal to said pull device when acceleration of a vehicle exceeds a predetermined level.

3. A pretensioner system as claimed in claim 1, wherein said frame has a retractor adapted to retract and extract the seat belt.

4. A pretensioner system as claimed in claim 3, wherein said second grip member is fixed to said frame.

5. A pretensioner system as claimed in claim 3, wherein said second grip member is slidably mounted to said frame so as to move away from said retractor.

6. A pretensioner system for a seat belt adapted to be used together with a lock mechanism for the seat belt, comprising:
   a frame disposed near the lock mechanism,
   a pair of first and second grip members installed inside the frame for sandwiching therebetween the seat belt extending from the lock mechanism, said first grip member having a base end pivotally connected to the frame, the other end pivotally movable toward and away from said second grip member, and a pair of pins situated at side portions of the first grip member between the base end and the other end, said pins extending outwardly from the side portions of the first grip member through the frame,
   a pull member situated between the lock mechanism and the grip members and having a portion, said seat belt extending through said portion of the pull member,
   a pull device attached to the pull member and adapted to be connected to an acceleration sensing device, said pull device rapidly pulling said pull member in a direction transversely of the seat belt when said acceleration sensing device senses above a predetermined level, and
   moving means for moving said first grip member toward said second grip member when said pull member is pulled, said moving means including a pair of arm plates situated outside the frame, each arm plate having an end pivotally connected to the pull member and an elongated hole, said pins of the first grip member being situated in the respective elongated holes so that when the pull member is pulled by the pull device upon actuation of the acceleration sensing device, the seat belt is pulled in a direction transversely to a direction that the seat belt extends and after the seat belt is pulled for the predetermined length, the pins of the first grip member are pulled by means of the arm plates in the direction to allow the first grip member to engage with the second grip member to thereby firmly lock the seat belt between the first and second grip members.

7. A pretensioner system for a seat belt adapted to be used together with a lock mechanism for the seat belt, comprising,
   a frame disposed near the lock mechanism,
   a pair of first and second grip members installed on the frame for sandwiching therebetween the seat belt extending from the lock mechanism, said first grip member having a base end pivotally connected to the frame and the other end pivotally movable toward and away from said second grip member,
   a pull member situated between the lock mechanism and the grip members and having a portion, said seat belt extending through said portion of the pull member,
   a pull device attached to the pull member and adapted to be connected to an acceleration sensing device, said pull device rapidly pulling said pull member in a direction transversely of the seat belt when said acceleration sensing device senses above a predetermined level, and moving means for moving said first grip member toward said second grip member when said pull member is pulled, said moving means including a spring situated between the first grip member and the frame to urge the first grip member to move toward the second grip member and a rope situated between the first grip member and the pull member to prevent the first grip member to move toward the second grip member by the spring, said rope, when the pull member is pulled by the pull device upon actuation of the acceleration sensing device, being cut by the movement of the pull member to thereby allow the first grip member to move toward the second grip member by means of the spring and to lock the seat belt between the first and second grip members.

* * * * *